(12) United States Patent
Givoni (10) Patent No.: US 9,904,736 B2
(45) Date of Patent: Feb. 27, 2018

(54) DETERMINING KEY EBOOK TERMS FOR PRESENTATION OF ADDITIONAL INFORMATION RELATED THERETO

(71) Applicant: Rakuten Kobo, Inc., Toronto (CA)

(72) Inventor: Inmar-Ella Givoni, Toronto (CA)

(73) Assignee: Rakuten Kobo, Inc., Toronto (CA)

( * ) Notice: Subject to any disclaimer, the term of this patent is extended or adjusted under 35 U.S.C. 154(b) by 1108 days.

(21) Appl. No.: 13/924,339

(22) Filed: Jun. 21, 2013

(65) Prior Publication Data
US 2014/0379707 A1 Dec. 25, 2014

(51) Int. Cl.
G06F 7/00 (2006.01)
G06F 17/30 (2006.01)
G06F 17/27 (2006.01)
G06F 17/24 (2006.01)
G06F 17/22 (2006.01)

(52) U.S. Cl.
CPC ...... *G06F 17/30882* (2013.01); *G06F 17/241* (2013.01); *G06F 17/2785* (2013.01); *G06F 17/30011* (2013.01); *G06F 17/30014* (2013.01); *G06F 17/30613* (2013.01); *G06F 17/2235* (2013.01)

(58) Field of Classification Search
CPC ............... G06F 17/241; G06F 17/2785; G06F 17/30613; G06F 17/30011
See application file for complete search history.

(56) References Cited

U.S. PATENT DOCUMENTS

| | | | | |
|---|---|---|---|---|
| 8,751,498 B2* | 6/2014 | Laroco, Jr. | ........ | G06F 17/30876 707/729 |
| 2008/0154848 A1* | 6/2008 | Haslam | ............. | G06F 17/30011 |
| 2010/0145678 A1* | 6/2010 | Csomai | ............... | G06F 17/2755 704/9 |
| 2012/0173578 A1* | 7/2012 | Cheong | ............. | G06F 17/30616 707/780 |
| 2013/0204876 A1* | 8/2013 | Szucs | ................ | G06F 17/30737 707/738 |

OTHER PUBLICATIONS

L. Ratinov et al, Local and Global Algorithms for Disambiguation to Wikipedia, ACL '11, 2011.
R. Cilibrasi and P. Vitanyi, The Google Similarity Distance, IEEE Transactions on Knowledge and Data Engineering, vol. 19, No. 3, Mar. 2007, pp. 370-383.

* cited by examiner

*Primary Examiner* — Charles Lu
(74) *Attorney, Agent, or Firm* — Oblon, McClelland, Maier & Neustadt, L.L.P.

(57) ABSTRACT

Systems and methods for rendering automatic annotation for electronic books with external information provided by an information database. A computer implemented method is used to automatically determine key terms and match the key terms with correct information from external information sources for presentation at an e-book page. The key terms can be detected based on a TF-IDF based content analysis process. The detected key terms can be processed by a disambiguation process to select the pertinent definition for multi-sense terms according to one or more selected information sources. Hyperlinks can be embedded in the key terms for direct and convenient link to the matching external information in response to user interactions.

10 Claims, 6 Drawing Sheets

DETERMINING KEY EBOOK TERMS FOR PRESENTATION OF ADDITIONAL INFORMATION RELATED THERETO

TECHNICAL FIELD

The present disclosure relates generally to the field of electronic text, e.g., electronic books, and, more specifically, to the field of computerized annotation of electronic text.

BACKGROUND

When reading an electronic or conventional book, a reader often encounters interesting or strange terms that he or she wants to have more knowledge about, in addition to what the book itself presents. Mostly likely, the knowledge is readily available on the Internet. For example, online encyclopedia databases, such as Wikipedia, are popular resources that contain a very large amount of well-organized information that covers almost every conceivable subject matter. Conventionally, the reader can find a computing device connected to the Internet, open an internet browser to visit Wikipedia, and then submit his or her search term to get the relevant information on the book term. The reader may find the process cumbersome and interruptive and so give up the intention for a deep dive experience.

"Wikification" refers to the task of automatically linking text-based content to Wikipedia entries corresponding to terms mentioned in the text. Common terms of interest are people, places, organizations and similar categories. Typically a Wikification process involves implementation of two primary steps: (1) detection of suitable candidate terms that are potentially interesting to a user, and (2) disambiguation of some candidate terms that may match to several Wikipedia entries. For instance, depending on the context, the term "Chicago" can mean the city, the musical movie, and as many as 80 or so additional definitions currently listed in the Wikipedia disambiguation page for "Chicago." Conventionally, most systems solve the disambiguation problem by analyzing the raw context surrounding the candidate term in order to determine which of the matching titles is the most relevant to the context, and therefore, presumably, to the term itself. This approach may not be efficient in locating the correct match.

In addition, most of the existing efforts of wikification are directed to analysis and tagging of raw text in a website, scientific articles, and other relatively short text excerpts. The application of wikification on large volumes of text corpus such as books has been limited.

SUMMARY OF THE INVENTION

It would be advantageous to provide a convenient approach that can facilitate an ebook reader to present to the reader a deep dive experience on interesting subjects mentioned in a book. Accordingly, embodiment of the present disclosure employs a computer implemented method of automatically determining relevant terms, or key terms in a book, and matching the relevant terms with correct information from external information sources for presentation at an e-book page displayed on an electronic device. A list of relevant terms can be automatically detected based on a TF-IDF based content analysis process. The relevant terms are disambiguated to select the most relevant definition for multi-sense terms that have multiple definitions within a selected information source. Hyperlinks can be embedded in the relevant terms in the ebook. Thereby, once a user selects such a relevant term, external information related to the term can be advantageously displayed directly and promptly on the electronic reader through a network connection.

In one embodiment of present disclosure, a computer implemented method of annotating an electronic book comprises: (1) accessing an information source site, the information source site comprising a plurality of webpages, each webpage associated with a subject title; (2) accessing content of the electronic book; (3) identifying a first plurality of terms from the electronic book, each term of the first plurality of terms related to one or more webpages of the information source site; (4) matching each term of the first plurality of terms to a respective webpage of the information source site based on a context of the electronic book; (5) filtering the first plurality of terms based on a predetermined criteria to obtain a second plurality of terms; and (6) establishing hyperlinks between the second plurality of terms with respective matching webpages of the information source site. Matching term to a respective webpage may comprise disambiguating a multi-sense term to a single matching webpage based on relatedness of the multi-sense term with the context terms on the list. The relatedness may be determined in accordance with a respective similarity between each webpage associated with the multi-sense term and each webpage associated with the context terms. The method may further comprise: (1) mining data of the information source site to create an index, and an incoming link graph structure to all the subject titles; (2) computing similarity scores in accordance with an incoming link dependent measure; (3) deriving relatedness by computing weighted averages to similarity scores associated with the multi-sense term. The identification of a first plurality of terms may be implemented based on a TF-IDF analysis which may operate on an N-gram basis.

In another embodiment of present disclosure, a non-transitory computer-readable storage medium embodying instructions that, when executed by a processing device, cause the processing device to perform a method of disambiguating terms extracted from an electronic text, wherein the method comprises: (1) accessing an index to topics of a digital encyclopedia database, wherein each topic corresponds to one or more documents in the digital encyclopedia database; (2) selecting a plurality of terms from the electronic text, each term of the plurality of terms corresponding to a topic of the digital encyclopedia database, the plurality of terms comprising one or more multi-sense terms; (3) computing relatedness of a respective multi-sense term with other terms of the plurality of terms, the respective multi-sense term matching multiple documents in the digital encyclopedia database; and (4) identifying a matching document to the respective multi-sense term from the multiple documents based on the relatedness.

In another embodiment of present disclosure, a system comprises: a processor; a memory coupled to the processor and comprising instructions that, when executed by the processor, causes the processor to perform a method of annotating the electronic book by use of information from one or more information source sites, wherein the method comprise: (1) accessing an information source site hosted by a server system, the source site comprising plurality of webpages, each webpage associated with a subject title; (2) accessing a portion of the electronic book; (3) identifying a first plurality of terms from the electronic book, each term of the first plurality of terms related to one or more webpages of the information source site; (4) matching each term of the first plurality of terms to a respective webpage of the information source site based on a context of the electronic book; (5) filtering the first plurality of terms based on a predetermined standard to obtain a second plurality of terms; and (6) establishing hyperlinks between the second plurality of terms with respective matching webpages of the information source site, the respective matching webpages associated with respective matching subject titles.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Figure 1:
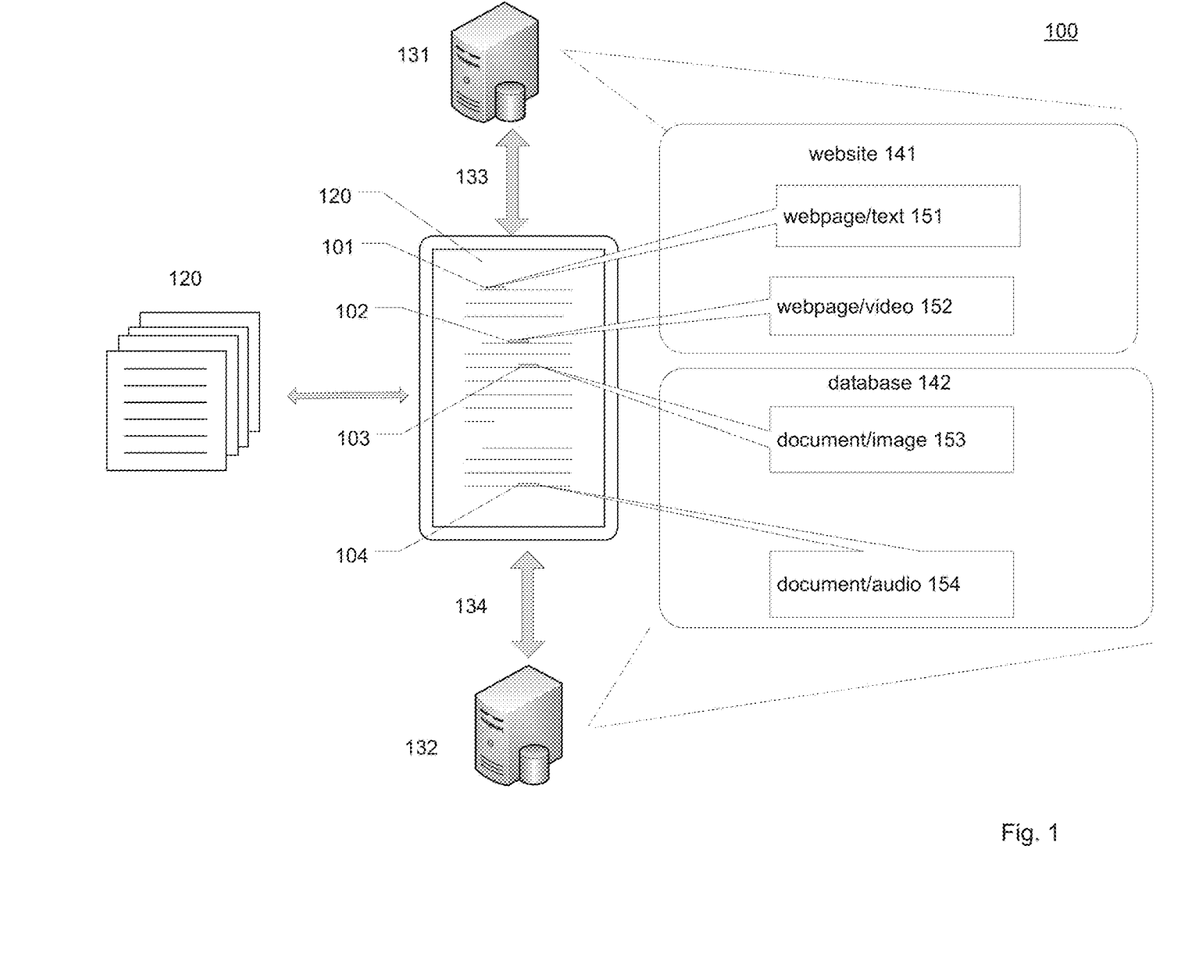
FIG. 1 illustrates an exemplary system that can facilitate a reader to obtain external information on preselected terms in an annotated ebook through an electronic reader in accordance with an embodiment of the present disclosure.

Determining Key Ebook Terms for Presentation of Additional Information Related thereto FIG. 1 illustrates an exemplary system that can facilitate a user to obtain external information on preselected terms in an annotated ebook 120 or a passage thereof through an electronic reader 110 in accordance with an embodiment of the present disclosure. The annotated ebook 120 comprises annotations on a plurality of automatically preselected terms with hyperlinks embedded therein. The preselected terms may be the terms that capture the essence of the book or chapter, which may be potentially interesting to an average reader. The annotated ebook 120 can be stored in a storage device of the electronic reader 110 and its content can be displayed on the display panel. As illustrated, the present displayed ebook page 120 comprises discernible marks that identify four annotated terms 101-104. When the user selects an annotated term by a suitable input means, the embedded hyperlink associated with the annotated term can lead to a matching document hosted by a specific information database. The matching document or a portion thereof containing information related to the annotated term can be on-screen presented to the user through the electronic reader 110 quickly without requiring the user personally entering an information website and submitting an inquiry. Therefore, the reader can advantageously take the shortcut to acquire additional information related to a preselected term. The present disclosure is not limited by any particular manner of presenting the related information to a user on an electronic reader.

A variety of devices run electronic book reader software such as personal computers, handheld personal digital assistants (PDAs), cellular phones with displays, and so forth.

Any suitable database server may act as an information source to provide pertinent annotation for selected terms in accordance with the present disclosure. Also, any suitable method can be used to retrieve information from an information source for purposes of practicing the present disclosure. More than one information source accessible to a public reader can be used to provide annotation for an electronic book by virtue of network connections, e.g. WAN, LAN, or WiFi. In the illustrated example, webpages 151 and 152 from an information website 141 hosted by the server 131 are used to annotate terms 101 and 102. To name a few examples, the information website 141 can be any well known information source, such as Wikipedia, Baidu, Canadian Encyclopedia, Credo Reference, EcuRed, or Grolier Multimedia Encyclopedia. Whereas, documents 153 and 154 stored in a local database server 142 are more pertinent to terms 103 and 104 and therefore are used to provide annotation to these two terms respectively. The information sources may contain image, video, or audio content, in addition to text-related content that are presentable on an electronic device.

Figure 2:
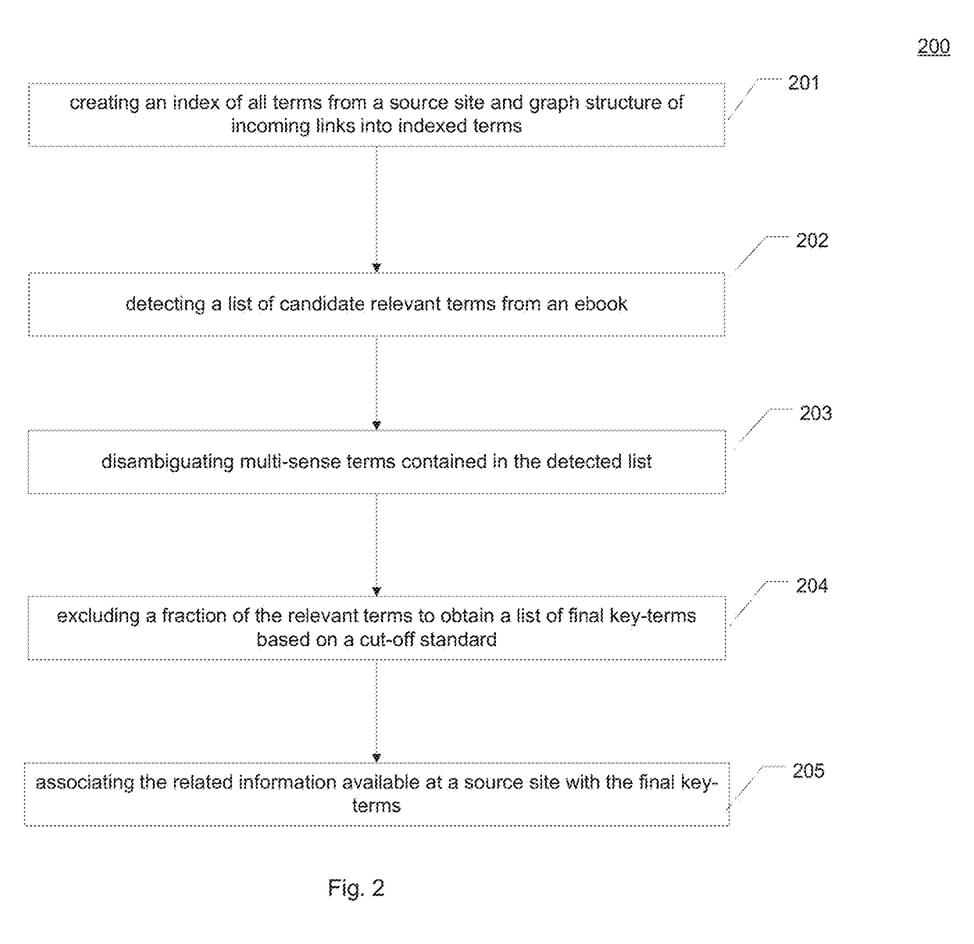
FIG. 2 is a flow chart depicting an exemplary computer implemented method of automatically annotating an electronic book or book passage in according to an embodiment of the present disclosure.

FIG. 2 is a flow chart depicting an exemplary computer implemented method 200 of automatically annotating an electronic book in according to an embodiment of the present disclosure.

At 201, assuming a source site has been selected for a specific ebook, an index of all terms from the source site can be created through data mining or directly accessed if an index is available from the source site. A graph structure of incoming links to the indexed terms can also created or accessed.

At 202, a list of candidate relevant terms can be automatically detected from the ebook. Relevant terms, or key terms, may refer to the terms that are both frequent to a chapter or a book and are specific to it. The detected terms may comprise any type of expression recognizable by a computer, such as a word, a phrase, a symbol, etc. For purposes of practicing the present disclosure, any computer implemented method that is well known in the art can be used to identify the relevant terms from a book. In some embodiments, a raw-text-centric approach can be used. Whereas, in some other embodiments, a chapter-centric or book-centric approach can be used. In still some other embodiments, a combination of such methods can be used.

In some embodiments, the process of detecting relevant terms may be based on terms' frequency in a selected library and specificity to the context of the ebook. For instance, the word "and" is frequency in every book, but is not specific. The character "Radagast" is very specific to the Tolkien Legendarium but is only mentioned once in "*The Hobbit.*" In contrast, a character name, such as "Kvothe the Bloodless" is very common in the book "*The name of the Wind,*" and is also very specific to the "*Kingkiller Chronicle*" series of books. In some of these embodiments, a Named Entity Recognition (NER) system can be used for term detection Such a system is typically trained for a specific language.

Alternatively, the detection process can be based on a non-language-specific approach that is applicable on books and associated external information of any language. For example, a term frequency-inverse document frequency (TF-IDF)-based content analysis process can be used to locate the relevant terms for annotation and can result in a scoring of words that takes into account frequency and specificity. In some embodiments, high scoring words can be selected as good candidates for relevant terms. The TF-IDF based analysis may operate on a whole book, or on individual chapters. The TF-IDF based analysis may operate on single words or on N-grams of various lengths. In some embodiments, N is set to a fixed number, e.g. 5. In some other embodiments, 1, 2, 3, 4, up to N grams can be analyzed. When processing N-grams, all N-gram counts can be stored for all content in some embodiments. However, in some other embodiments, only counts for N-grams that match to existing database titles in key categories are stored, which can considerably simplify storage usage.

In some embodiments, the list of candidate relevant terms may be updated by periodically processing new database entries. For example, based on the difference of new entries compared to what has already been processed, all the ebooks can be searched for occurrences of the new database entries in an updating process. Further, by quickly checking the unigrams for each book that are likely readily available at the beginning of such an updating process, most volumes can be filtered out before proceeding to search the raw text.

In some embodiments, the automatically generated list of relevant terms as a result of process 202 may be subject to a verification process through which some of the candidate terms are removed from further processing. For example, the list of detected candidate relevant terms may be ranked in the order of relevancy to the subject of the chapter or book. The relevancy ranking may be used to screen out the terms with low relevancy on the list. In some embodiments, the detected relevant terms may be subject to a stemming process that transforms the inflictions to the root term to avoid redundant annotation on terms sharing the same root. In some embodiments, the verification process may include performing measures to remove tokenization errors.

Because a relevant term produced by the process of 202 may bear multiple senses, e.g. a homograph term, and thus correspond to multiple definitions within a selected information source, a disambiguating process can be employed at 203 in order to match the most relevant definition for the term. For example, depending on the context, a term "jaguar" may refer to the animal or a car brand, and both definitions have a corresponding webpage in Wikipedia. The present disclosure is not limited to any particular disambiguating process. The disambiguation may be based on a context of the ebook, such as raw text of a chapter or a section that surrounds a selected term. Alternatively, as to be described in greater detail below, the extracted list of candidate terms can be regarded as the context for disambiguation purposes. Further, a combination of candidate term context approach and raw-text context approach can be utilized for disambiguation.

After the detection and disambiguation process, there may still be terms to be excluded. At 204, based on a cut-off standard, a fraction of the candidate relevant terms can be excluded to obtain a list of final key terms for annotation. For example, the cut-off standard may be configured to filter terms based on their relevancies, TF-IDF scores, categories, and/or a predetermined term number limit that can be defined with reference to the length of an individual chapter.

In the embodiments that adopt a category-based key term filtering approach, key categories, e.g. place and people, of key terms are first determined, for example, manually. Then each term is tagged with a category for category filtering purposes. Some information source site may contain category information on the entries that can be directly utilized in the filtering process. For example, each title entry in Wikipedia is assigned a category. Wikipedia also contains special webpages listing the categories in various formats.

After the final key terms are mapped to the respective correct documents from a source site, at 205, the documents are associated with the final key terms, for example, by use of hyperlinks embedded with the terms.

Figure 3:
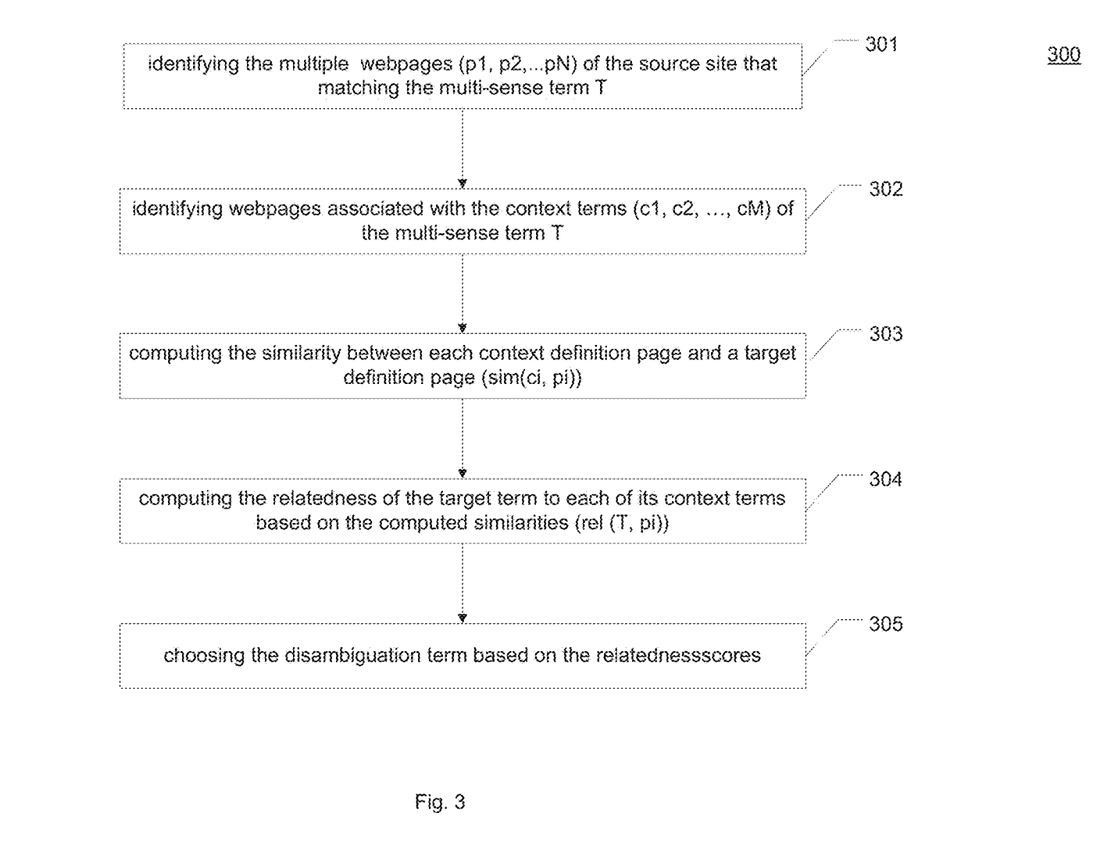
FIG. 3 is a flow chart depicting an exemplary computer implemented method of disambiguating a multi-sense term based on its relatedness with its context terms during a process of annotating an ebook in accordance with an embodiment of the present disclosure.

FIG. 3 is a flow chart depicting an exemplary computer implemented method 300 of disambiguating a multi-sense term (or a target term) based on context terms (which are the other terms on a list of detected terms) during a process of annotating an ebook in accordance with an embodiment of the present disclosure. Multi-sense terms herein refer to terms having more than one definition and associated to multiple documents in a database, e.g. an information source website.

At 301, the multiple webpages (p1, p2, . . . , pN), or documents, that match to the target term (T) are identified from the information source site(s). At 302, the webpages associated with context terms for target T are identified. In some embodiments, the context terms may be limited to anchor terms on the list that have exactly one definition in the database. Nonetheless, in some other embodiments, context terms associated with multiple documents can also be used for similarity computation.

At 303, with respect to each webpage associated with the target term (or a document associated with a potential disambiguation term), and each webpage associated with each context term of the target term, a similarity score, sim(context, title), is computed.

Generally speaking, it can be assumed not all contexts terms are equally useful for disambiguation and that those closely related to other context terms are likely more helpful for disambiguating a target term. Accordingly, at 304, for each potential disambiguation term, its relatedness to each of its context terms is computed by computing a weighted average to all the similarity scores correspond to that document. The weight factors can be computed so as to indicate how relevant each context term is to other context terms.

At 305, based on the relatedness and similarity scores, the webpage matching the target term in the context is chose. The matching webpage may be one having the best relatedness score.

Table 1 is an exemplary computer process that can be used to disambiguating a target term based on its context terms in accordance with an embodiment of the present disclosure. The algorithm in Table 1 can be used to implement a method that is similar with FIG. 3. In this embodiment, only anchor terms are used as context terms for relatedness computation.

TABLE 1

Data: Target term T with multiple matching Wikipedia title pages,
$p_1, \ldots, p_N$
Data: Wikipedia pages of unique entries among context terms for target
T, $c_1, \ldots, c_M$
Result: Best matching page p*
for $c_j$ do
  for $p_i$ do
    compute sim($c_j$, $p_i$);
  end
  compute rel(T, $p_i$) = $\frac{1}{M} \sum_j w_j \text{sim}(c_j, p_i)$;
end
return p* = $\max_i$ rel (T, $p_i$);

The similarity between a context definition page and a target definition page can be given by an incoming link dependent measure, e.g., $$sim(c_j, p_i) = \frac{\log(\max(|c_j|, |p_i|)) - \log(|c_j \cap p_i|)}{\log(|W|) - \log(\min(|c_j|, |p_i|))},$$

where W is the collection of webpage titles. For instance, the weight factors associated with every context term can be expressed as $$w_j = \frac{1}{M-1} \sum_{k, k \neq j} sim(c_j, c_k).$$

Figure 4:
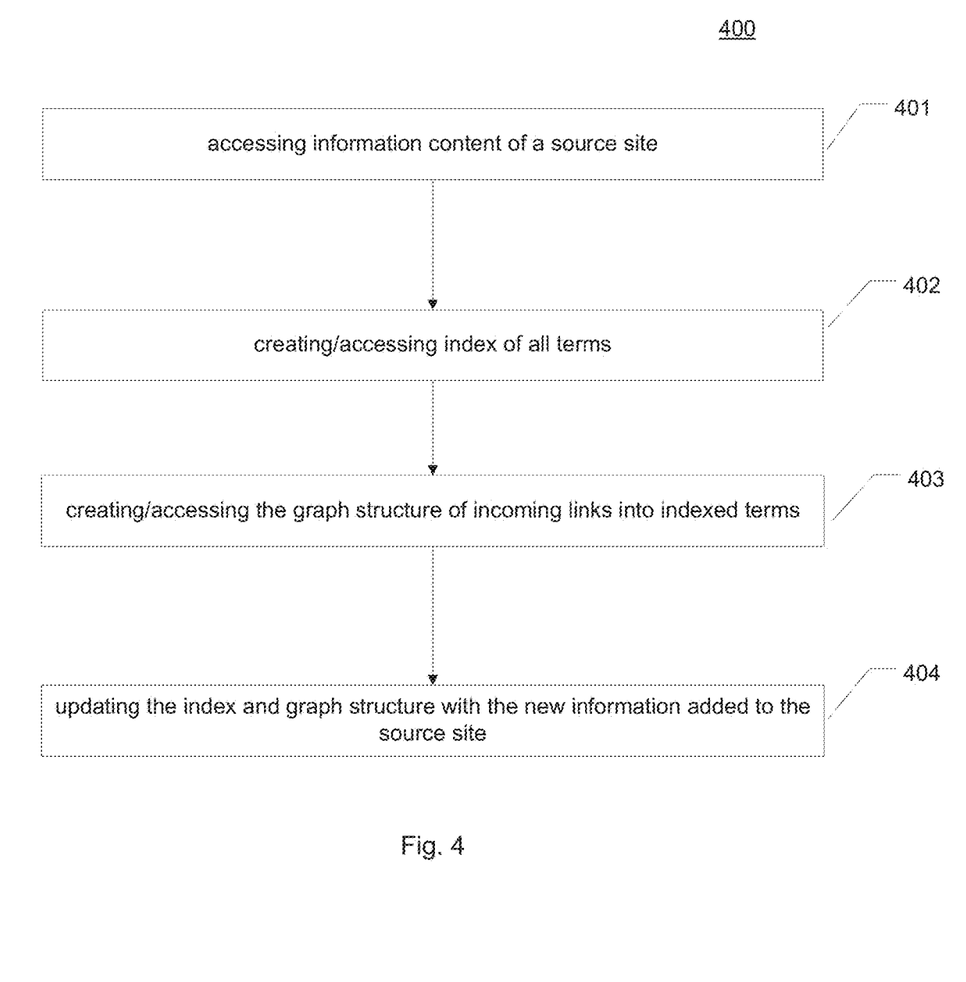
FIG. 4 is an exemplary computer implemented method of mining data from selected databases to supply indexes and graph structures for annotating an ebook in accordance with an embodiment of the present disclosure.

FIG. 4 is an exemplary computer implemented method 400 of mining data from selected databases to supply indexes and graph structures for annotating an ebook in accordance with an embodiment of the present disclosure. At 401, information content of a database, e.g. a source site, is accessed for processing. At 402, an index of all the terms can be created or accessed if the database has the index readily available. At 403, a graph structure of incoming links into indexed terms is created or accessed.

At 404, the index and graph structure is periodically updated with the new information added to the database. For example, for obtaining Wikipedia content, the Wikipedia server provides periodically updated dumps of the content in every language in both SQL and XML formats. Accordingly, the created index and graph structure may need to be updated periodically. A computer implemented interface to access the source site and output the index and graph structure to the content analysis module which will be described in greater details below may be built to implement method 400.

Figure 5:
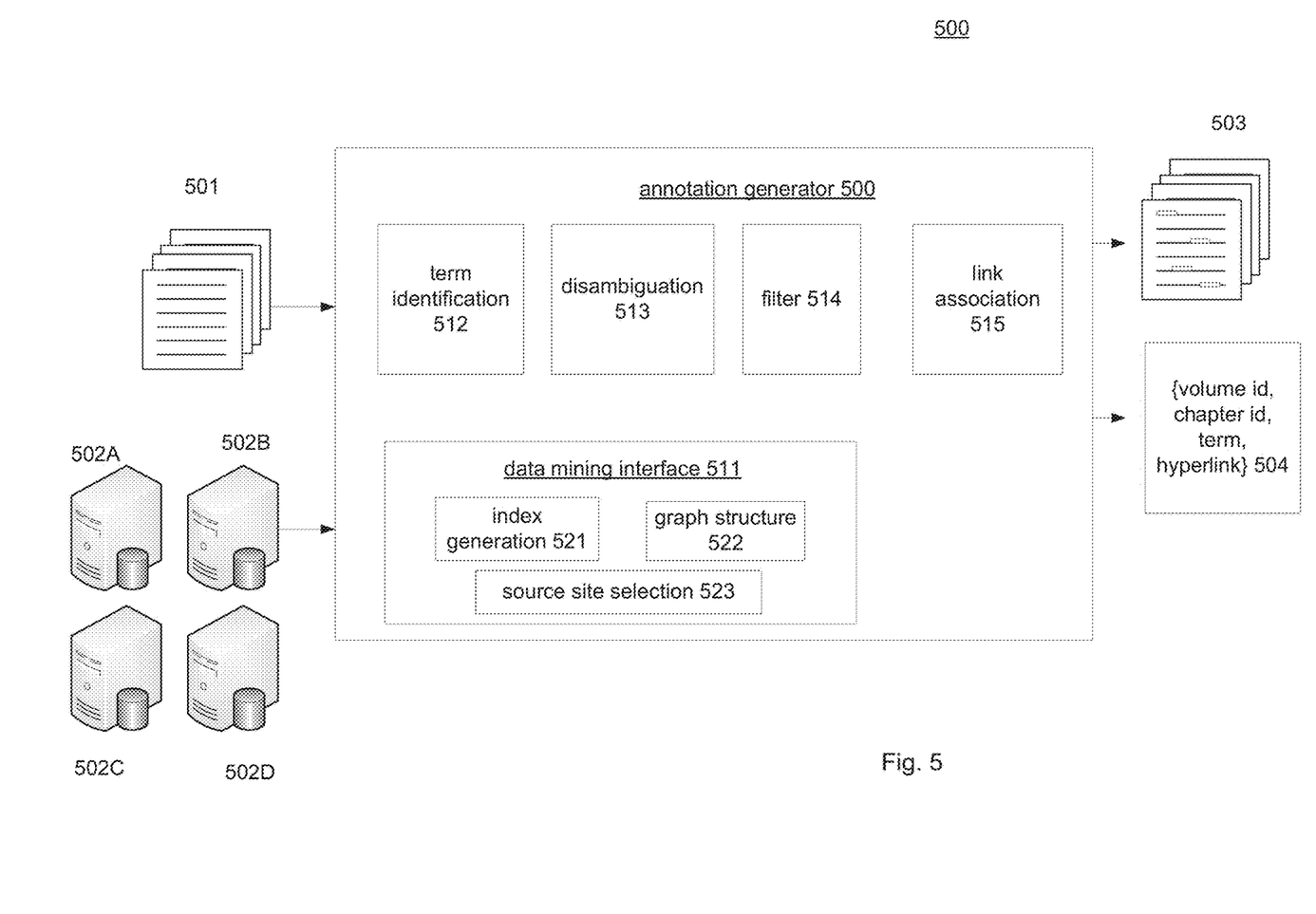
FIG. 5 is an exemplary functional block diagram an ebook annotation generator in accordance with an embodiment of the present disclosure.

FIG. 5 is a functional block diagram of an ebook annotation generator 500 in accordance with an embodiment of the present disclosure. The inputs to the annotation generator 500 comprise an ebook 501 for annotation, and selected databases 502A-D that are accessible through a communication network. The data mining interface module 511 may comprise an index generation module 521 and a graph structure module 522 which can be configured to generate indexes to and the incoming link graph structures respectively of the information provided by the databases 502 A-D. Further, the data mining interface module 511 may comprise a source site selection module 523 capable of automatically selecting a specific database that provides most pertinent annotation. The term detection module 512 is configured to automatically select a list of key terms for annotation, as discussed with reference to 202 in FIG. 2. The disambiguation module 513 is configured to disambiguate the multi-sense terms encompassed in the list of key terms. The filter module 514 is configured to remove some terms from the detected terms based on predefined criteria. The link association module 515 is configured to establish hyperlinks between the selected terms and the selected documents from the database for potential display on an electronic device. The locations of the hyperlinks may be indicated on to a potential reader on a graphic user interface in various suitable means, including colors, highlights, fonts, animation with respect to the selected terms. Eventually, external information related to a key term can be displayed directly and promptly on the electronic reader in response to a user interaction.

The output from the annotation generator 500 comprises an annotated ebook 503 with hyperlinks associated with selected and disambiguated terms. In addition, the generator 500 may also output information collected from the book and the annotation process to be provided to various client applications. For example, each book chapter is associated with message tuples of a form similar to {volume id, chapter id, term, Wiki link} which can be output from the generator 500.

As will be appreciated by those with ordinary skills in the art, the annotation generator 500 can be implemented in any one or more suitable programming languages that are known to those skilled in the art, such as C, C++, Java, Python, Perl, C#, SQL, etc.

Figure 6:
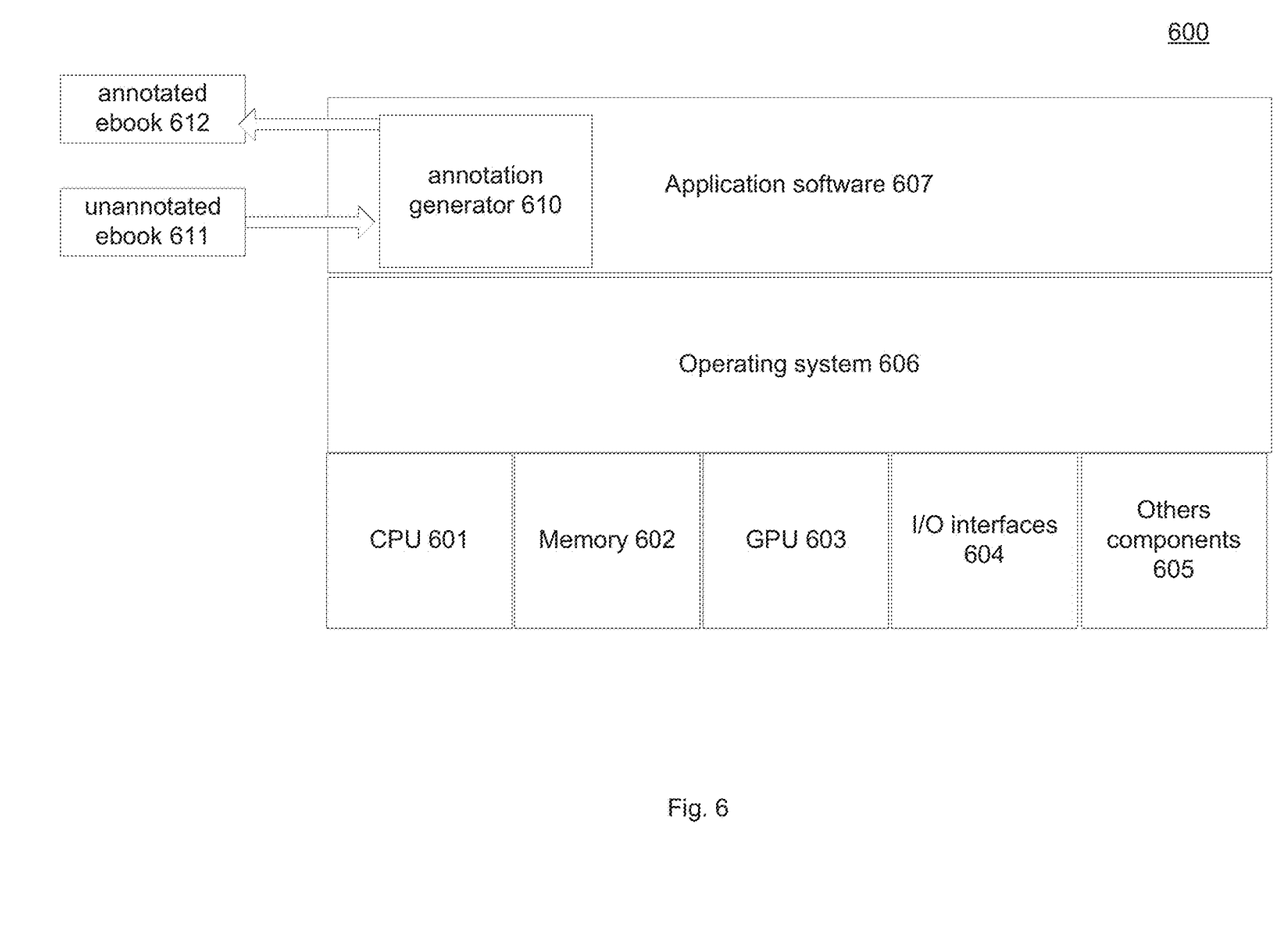
FIG. 6 is a block diagram illustrating an exemplary computing system including an ebook annotation generator in accordance with an embodiment of the present disclosure.

FIG. 6 is a block diagram illustrating an exemplary computing system 600 including an ebook annotation generator 610 in accordance with an embodiment of the present disclosure. The computing system comprises a processor 601, a system memory 602, a GPU 603, I/O interfaces 604 and network circuits 605, an operating system 606 and application software 607 including the annotation generator 610 stored in the memory 602. When incorporating the user's configuration input and executed by the CPU 601, the annotation generator 610 can produce annotation for an ebook with information provided by a database in accordance with an embodiment of the present disclosure. The annotation generator 610 may comprise a various functional modules as illustrated in FIG. 5. The user configuration input may include an ebook for processing, detection categories, filter standard, and information databases for example, as discussed with reference to FIG. 5.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of annotating an electronic book, said method comprising:
    accessing an information source site, said information source site comprising a plurality of webpages, each webpage associated with a subject title;
    accessing content of said electronic book;
    identifying a first plurality of terms from said electronic book, each term of said first plurality of terms related to one or more webpages of said information source site;
    matching each term of said first plurality of terms to a respective webpage of said information source site based on a context of said electronic book at least by disambiguating a first term within said first plurality of terms to a single matching webpage based on relatedness of said first term with other terms of said first plurality of terms, wherein said first term is associated with multiple webpages of said information source site, and wherein said relatedness is determined in accordance with a respective similarity between each of said multiple webpages associated with said first term and each webpage associated with each of said other terms of said first plurality of terms;
    mining data of said information source site to create an index to all subject titles therein and a graph structure of incoming links to said all subject titles;
    computing similarity scores in accordance with an incoming link dependent measure;
    deriving said relatedness by computing a weighted average to similarity scores associated with said first term, wherein said weighted average is computed based on weight factors determined in accordance with relatedness among terms of said other terms;
    obtaining a second plurality of terms by filtering said first plurality of terms based on a predetermined criteria; and
    establishing hyperlinks between said second plurality of terms with respective matching webpages of said information source site,
    wherein the link dependent measure is based on a first equation $$sim(c_j, p_i) = \frac{\log(\max(|c_j|, |p_i|)) - \log(|c_j \cap p_i|)}{\log(|W|) - \log(\min(|c_j|, |p_i|))},$$

wherein pi corresponds to a target term with multiple matching title pages, cj corresponds to pages of unique entries among context terms for the target term, and W corresponds to a collection of webpage titles.

2. The computer implemented method of claim 1, wherein said identifying said first plurality of terms comprises identifying said first plurality of terms from a chapter of said electronic book based on a term frequency inverse document frequency (TF-IDF)-based analysis in accordance with a frequency and a specificity of each of said first plurality of terms, and wherein further said first plurality of terms are associated with a common theme.

3. The computer implemented method of claim 2, wherein said TF-IDF based analysis is configured to operate on an N-gram basis.

4. The computer implemented method of claim 2 further comprising identifying said first plurality of terms by analyzing a raw text of a predetermined length of said electronic book.

5. The computer implemented method of claim 2, wherein said identifying said first plurality of terms further comprises stemming said first plurality of terms, wherein said stemming is configured to preempt duplicate hyperlinks within said chapter.

6. The computer implemented method of claim 2, wherein said first plurality of terms comprises words, phrases, and/or symbols.

7. A system comprising:
    a processor;
    a memory coupled to said processor and comprising instructions that, when executed by said processor, causes the processor to perform a method of annotating said electronic book by use of information from one or more information source sites, said method comprising:
        accessing an information source site hosted by a server system, said information source site comprising plurality of webpages, each webpage associated with a subject title;
        accessing a portion of said electronic book;
        identifying a first plurality of terms from said electronic book, each term of said first plurality of terms related to one or more webpages of said information source site;
        matching each term of said first plurality of terms to a respective webpage of said information source site based on a context of said electronic book at least by disambiguating a first term within said first plurality of terms to a single matching webpage based on relatedness of said first term with other terms of said first plurality of terms, wherein said first term is associated with multiple webpages of said information source site, and wherein said relatedness is determined in accordance with a respective similarity between each of said multiple webpages associated with said first term and each webpage associated with each of said other terms of said first plurality of terms;

mining data of said information source site to create an index to all subject titles therein and a graph structure of incoming links to said all subject titles;

computing similarity scores in accordance with an incoming link dependent measure;

deriving said relatedness by computing a weighted average to similarity scores associated with said first term, wherein said weighted average is computed based on weight factors determined in accordance with relatedness among terms of said other terms;

obtaining a second plurality of terms by filtering said first plurality of terms based on a predetermined criteria; and establishing hyperlinks between said second plurality of terms with respective matching webpages of said information source site, said respective matching webpages associated with respective matching subject titles, wherein the link dependent measure is based on a first equation $$sim(c_j, p_i) = \frac{\log(\max(|c_j|, |p_i|)) - \log(|c_j \cap p_i|)}{\log(|W|) - \log(\min(|c_j|, |p_i|))},$$

wherein pi corresponds to a target term with multiple matching title pages, cj corresponds to pages of unique entries among context terms for the target term, and W corresponds to a collection of webpage titles.

8. The system of claim 7, wherein said identifying a first plurality of terms comprises identifying a first plurality of terms from a chapter of said electronic book based on a term frequency inverse document frequency (TF-IDF)-based analysis in accordance with a frequency and a specificity of said each of said first plurality of terms, and wherein said TF-IDF is based on an N-gram approach.

9. The system of claim 7, wherein webpages in said information source site comprises contents selected from a group consisting of texts, audios, videos, images, and combinations thereof.

10. The system of claim 7, wherein said predetermined criteria comprises a term number limit with respect to said plurality of terms.

* * * * *